US008732832B2

(12) United States Patent
Kim et al.

(10) Patent No.: US 8,732,832 B2
(45) Date of Patent: May 20, 2014

(54) ROUTING APPARATUS AND METHOD FOR DETECTING SERVER ATTACK AND NETWORK USING THE SAME

(75) Inventors: Hak Suh Kim, Daejeon-si (KR); Kyoung Soon Kang, Daejeon-si (KR); Gang Uk Hwang, Daejeon-si (KR); Hyeon Je Cho, Gumi-si (KR); Myung Woo Lee, Busan-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 40 days.

(21) Appl. No.: 13/310,215

(22) Filed: Dec. 2, 2011

(65) Prior Publication Data

US 2012/0144487 A1    Jun. 7, 2012

(30) Foreign Application Priority Data

Dec. 2, 2010   (KR) .................... 10-2010-0122263

(51) Int. Cl.
*H04L 29/06* (2006.01)
*G06F 15/16* (2006.01)

(52) U.S. Cl.
USPC ............................................ 726/23; 709/224

(58) Field of Classification Search
None
See application file for complete search history.

(56) References Cited

U.S. PATENT DOCUMENTS

| | | | |
|---|---|---|---|
| 7,525,921 B1 * | 4/2009 | Yi Dar Lo | 370/241 |
| 7,898,966 B1 * | 3/2011 | Yi Dar Lo | 370/241 |
| 8,266,696 B2 * | 9/2012 | O'Rourke et al. | 726/23 |
| 2001/0042200 A1 | 11/2001 | Lamberton et al. | |
| 2008/0256632 A1 | 10/2008 | Stockdell | |
| 2009/0007266 A1 * | 1/2009 | Wu et al. | 726/22 |
| 2009/0077413 A1 * | 3/2009 | Dake et al. | 714/4 |
| 2009/0193115 A1 * | 7/2009 | Sugita | 709/224 |
| 2009/0293122 A1 * | 11/2009 | Abdel-Aziz et al. | 726/23 |
| 2012/0023366 A1 * | 1/2012 | Horii et al. | 714/15 |

FOREIGN PATENT DOCUMENTS

| | | |
|---|---|---|
| KR | 10-0908404 B1 | 7/2009 |
| KR | 1020100025796 | 3/2010 |

* cited by examiner

*Primary Examiner* — Christopher Revak
(74) *Attorney, Agent, or Firm* — Nelson Mullins Riley & Scarborough LLP

(57) ABSTRACT

Routing apparatus and method for detecting a server attack are disclosed. The routing apparatus includes: a reception unit configured to receive a packet transmitted in a network; a transmission unit configured to transmit the packet along a transmission path; a memory unit configured to store data and/or information required for an operation; and a controller configured to set the transmission path of the packet in the network and perform packet switching along the set transmission path, wherein the reception unit receives server state information from servers at every certain time, the memory unit stores the received server state information, and the controller calculates a change in the state of the servers based on the received server state information, and determines that a server is attacked when a change in the state of the server is greater than a certain threshold value.

18 Claims, 5 Drawing Sheets

ROUTING APPARATUS AND METHOD FOR DETECTING SERVER ATTACK AND NETWORK USING THE SAME

CROSS-REFERENCE TO RELATED APPLICATIONS

This application claims the benefit of priority of Korean Patent Application No. 10-2010-0122263 filed on Dec. 2, 2010, which is incorporated by reference in their entirety herein.

BACKGROUND OF THE INVENTION

1. Field of the Invention

The present invention relates to a method for protecting a server in a network and, more particularly, to a method for detecting an attack to servers and handling the same by a routing apparatus in a network.

2. Description of the Related Art

Attacks targeting weak points in a network are increasing in line with the advancement of a network technology including the Internet. Attacks in a network are becoming growingly indiscriminate and automated.

The attacks include three types: a method of taking advantage of a weak point of a system or using a bug implemented as software; a method of completely consuming resources available for a target of an attack; and a method of completely consuming available bandwidths.

In particular, in case of the Internet, network security is interdependent, so different hosts can be easily attacked through a security-breached area. Also, since an Internet host, a network, or the like, are operated without limited resources, a processing bandwidth, an operation throughput, a storage capacity, and the like, are all limited, making the Internet susceptible to an attack. The properties of non-connective Internet protocol (IP) make it difficult to track an intruder.

In addition, most of the functions guaranteeing a service in the network are positioned in an end host, and since an intermediate node has merely a limited function such as delivery of packets, or the like, the burden of network attacks to the end host grows heavier.

SUMMARY OF THE INVENTION

Therefore, an object of the present invention is to provide a method for effectively detecting an attack to a server in a network.

Another object of the present invention is to provide a method for detecting an attack to a server in a network by a routing apparatus positioned at a lead-in stage (or inward stage) of the network and effectively handling it.

Still another object of the present invention is to provide a routing apparatus capable of effectively detecting and handling an attack to a server in a network.

To achieve the above objects, there is provided a routing apparatus including: a reception unit configured to receive a packet transmitted in a network; a transmission unit configured to transmit the packet along a transmission path; a memory unit configured to store data and/or information required for an operation; and a controller configured to set the transmission path of the packet in the network and perform packet switching along the set transmission path, wherein the reception unit receives server state information from servers at every certain time, the memory unit stores the received server state information, and the controller calculates a change in the state of the servers based on the received server state information, and determines that a server is attacked when a change in the state of the server is greater than a certain threshold value.

The state information of the server may be information regarding a CPU load of the server, and when an increased amount of the CPU load of the server is greater than a certain threshold value, the controller may determine that the corresponding server is under attack.

The state information of the server may be information regarding a memory utilization rate of the server, and when an increased amount of the memory utilization rate of the server is greater than a certain threshold value, the controller may determine that the corresponding server is under attack.

The state information of the server may be information regarding a backlog queue, and when an increased amount of connection requests on standby in the backlog queue of the server is greater than a certain threshold value, the controller may determine that the corresponding server is under attack.

The state information of the server may be information regarding a backlog queue, and when the number of connection requests on standby in the backlog queue of the server is greater than a certain threshold value, the controller may determine that the corresponding server is under attack.

When the controller determines that the corresponding server is under attack, the controller may regulate traffic with respect to the corresponding server.

When the controller determines that the corresponding server is under attack, the controller may notify a network manager and/or a manager of the corresponding server accordingly.

To achieve the above objects, there is also provided a method for detecting an attack to a server by a network routing apparatus, including: receiving server state information from servers in a network at every certain time; calculating a change in each of the server states based on the server state information received at every certain time; determining whether or not a server is under attack based on the calculated change in each of the server states; and when it is determined that a server is under attack, regulating traffic with respect to the server.

To achieve the above objects, there is also provided a network including: a routing apparatus for controlling a transmission path of a packet and traffic in a network; and servers in the network, wherein the routing apparatus includes a reception unit configured to receive server state information from the servers in the network; a memory unit configured to store the received server state information; and a controller configured to calculate a change in each of the server states based on the received server state information, wherein the servers transmit information regarding a server state to the routing apparatus at every certain time, and when a change in a server state is greater than a certain threshold value, the controller of the routing apparatus determines that the corresponding server is under attack.

According to an exemplary embodiment of the present invention, an attack to a server in a network can be effectively detected.

According to an exemplary embodiment of the present invention, an attack to a server in a network can be detected by a routing apparatus positioned at a lead-in stage of the network and effectively handled.

According to an exemplary embodiment of the present invention, the routing apparatus can effectively detect and handle an attack to a server in a network.

The foregoing and other objects, features, aspects and advantages of the present invention will become more appar-

DETAILED DESCRIPTION OF THE INVENTION

The present invention relates to a method for protecting servers by a routing apparatus positioned at a lead-in stage (or an inward stage) of a network in which the servers provide services.

Also, the present invention relates to a routing apparatus for reporting servers in a network in which the servers provide services.

The routing apparatus receives information regarding a current state of servers from the respective servers in a network. The routing apparatus may determine whether or not a server is currently under attack by using the server state information. The routing apparatus can regulate traffic with respect to the server determined to be attacked. Since the routing apparatus reduces the traffic with respect to the corresponding server to an appropriate level, the corresponding server can continue to provide the original service. The routing apparatus may notify a manager that the corresponding server is under attack. Accordingly, the manager may be able to take a countermeasure for a network operation.

In general, a distributed denial of service (DDoS) is instantaneously transmitting a large amount of data to an attack target such as various servers, or the like, in a network to incapacitate the attack target from normally operating.

Figure 1:
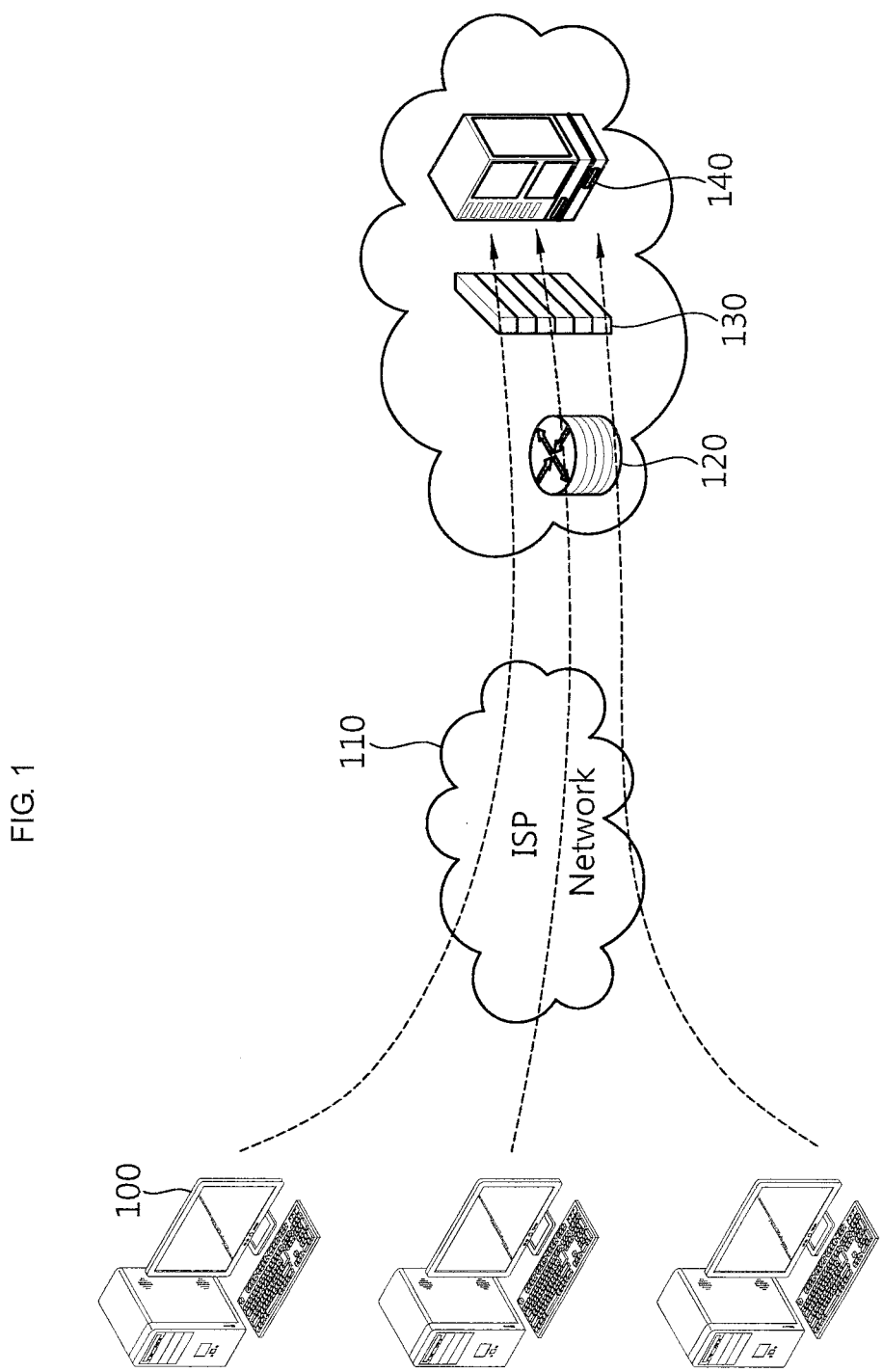
FIG. 1 is a conceptual view showing an example of a distributed denial of service (DDoS) attack.
Figure 2:
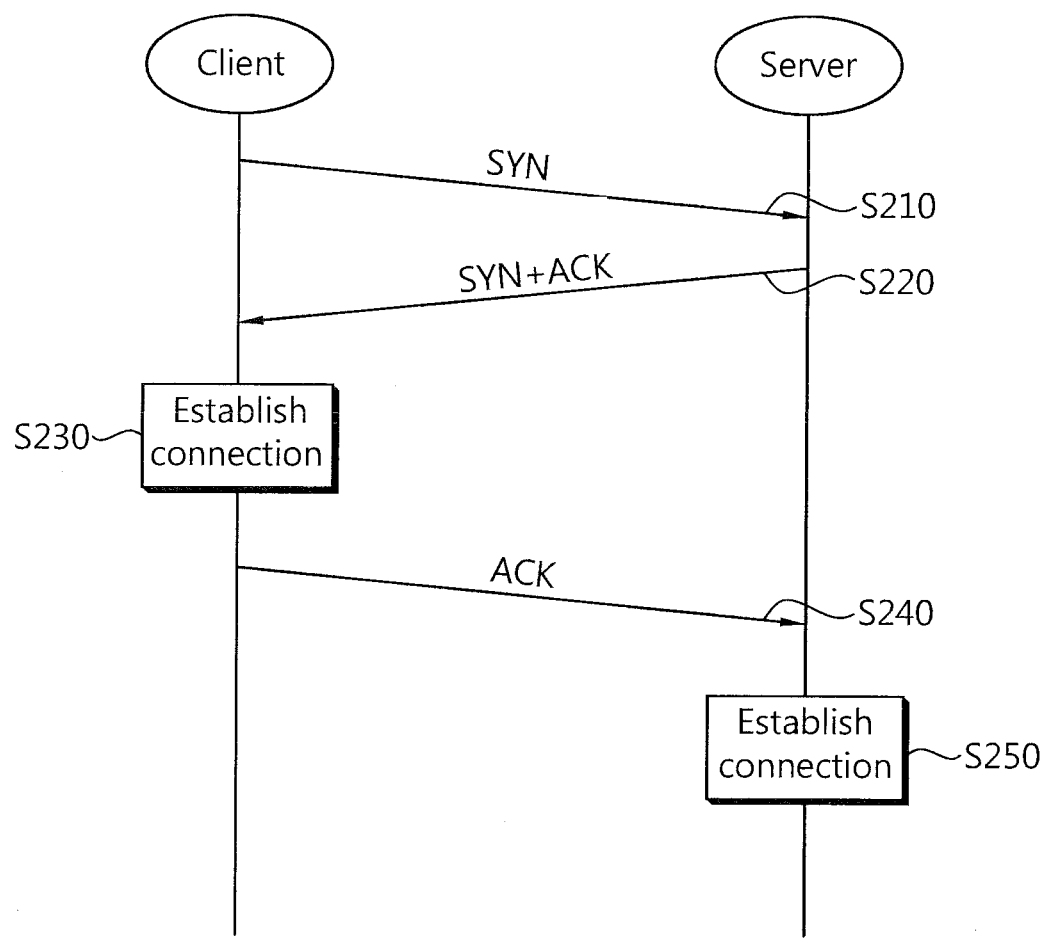
FIG. 2 is a flow chart illustrating the process of a method for establishing a connection of a TCP.

FIG. 1 is a conceptual view showing an example of a DDoS attack.

PCs 100 infected with a malicious virus, or the like, generates a large amount of traffic through an Internet service provider (ISP) network 110. A general router 1120 sends the introduced traffic to a network in which a fire wall 130 and an attack target 140 are positioned along a transmission path of a packet.

The introduction of the large amount of traffic makes the fire wall 130, the attack target 140, or the like, unequal to the load, down or fail to normally function.

The DDoS attack includes Internet control message protocol (ICMP) flooding, user datagram protocol (UDP) flooding, transmission control protocol (TCP) flooding, TCP SYN flooding, and the like.

In the ICMP flooding method, an IDMP echo request message is transmitted to a broadcast address to allow every system to transmit an echo response message to an attack target. The attack target consumes system resources to process all the requests, resulting in the loss of the system function.

In the UDP flooding method, a large amount of UDP packets are transmitted to an IP of the attack target. An attacker designates a destination port and transmits a UDP packet. Hosts, upon receiving the UDP packets, starts to find an application with respect to a corresponding port. When the hosts fail to find the application, they transmit unreachable message to the attack target set as a source address of the UDP packet, and the system function of the attack target is lost due to the large amount of messages.

In the TCP flooding method, a large amount of TCP packets are transmitted to an IP of the attack target, which is basically the same as the UDP flooding method.

The TCP SYN flooding method uses a weak point of the TCP connection establishment scheme. An attacker transmits a TCP packet for requesting a connection to the attack target and the does not send an ACK message for establishing a connection. The attack target remains in standby for establishing a connection and the capacity of a backlog queue, a memory space, for establishing a connection is exhausted.

Hereinafter, an example of application of the present invention through the TCP SYN flooding, one of the most typical DDoS attack schemes, will now be described.

A client transmits a SYN message for requesting a connection to a server (S210). The server receives the SYN message from the client and transmits a SYN message for requesting a connection along with an ACK message with respect to the SYN message of the client to the client (S220). At this time, the server keeps the corresponding connection request from the client in a backlog queue.

When the client receives the ACK message and the SYN message from the server, it establishes a connection with the sever (S230). The client transmits an ACK message with respect to the ACK message and SYN message, which have been received from the server, to the server (S240). The server receives the ACK message from the client and establishes a connection with the client (S250).

When the server transmits the ACK message and the SYN message to the client, the corresponding connection request is on standby in a half-open state in the backlog queue. When the server receives the ACK message from the client, a TCP connection is established and the corresponding connection request is deleted from the backlog queue. When the server fails to receive the ACK message, the corresponding connection request is deleted from the backlog queue and a TCP connection is not established.

In this case, in a state in which the attacker transmits the SYN message to the server by using a plurality of client computers, when the attacker continuously transmits the SYN message after receiving the SYN message and the ACK message, the backlog queue of the server is full of the continuous transmission requests. Thus, the server cannot receive the service connection requests any more, so the server is in a service denial state.

The TCP SYN flooding is an attack using the operational characteristics of the TCP. Namely, because it follows the TCP connection scheme, it is difficult to detect an attack in advance in a network. When the server recognizes that it has been attacked after it was damaged, it is more difficult for the server to take a countermeasure against the attack and its damage increases as much.

However, as can be noted from the description of the foregoing TCP SYN flooding, in the occurrence of the DDoS, the state of the system, in particular, the state of the server changes. For example, in case of the TCP SYN flooding, the state of the backlog queue of the attack target sharply increases. Also, traffic with respect to the attack target or the process to be processed by the attack target is sharply increased, greatly changing the state of the attack target such as a CPU load or a memory utilization rate.

Thus, the DDoS can be detected by checking status information such as a CPU load of the server, a connection request standby amount of the backlog queue of the server, the memory utilization rate of the server, or the like, periodically or at a time according to determined conditions.

In an exemplary embodiment of the present invention, a routing apparatus located at a lead-in stage of a network may receive information regarding a current status of each of servers in a network and detect whether or not a server is under attack based on the information. Also, when a server is determined to be attacked, the routing apparatus is able to reduce or cut off traffic output to the corresponding server to thus allow the corresponding server to maintain its function.

Accordingly, various firewalls or protection systems positioned at a rear stage of the routing apparatus can be induced to normally operate and an attack target can be protected so that its function cannot be lost.

Since the routing apparatus can reduce only the traffic output to the attack target, rather than reducing or cutting off overall traffic, due to the attack against the particular target, other servers in the network can be prevented from being affected by the attack.

Exemplary embodiments of the present invention will now be described in detail with reference to the accompanying drawings. In applying reference numerals to elements of each drawing, the same reference numerals are used for the same elements although they are shown on different drawings. In describing the present invention, if a detailed explanation for a related known function or construction is considered to unnecessarily divert the gist of the present invention, such explanation has been omitted but would be understood by those skilled in the art.

It will be understood that, although the terms first, second, A, B, (a), or (b) may be used herein to describe various elements, these elements should not be limited by these terms. These terms are only used to distinguish one element from another, without limiting the essence, order, or sequence of corresponding elements. It will also be understood that when an element is referred to as being "connected with" or "coupled to" another element, it can be directly connected with the other element or intervening elements may also be present. In contrast, when an element is referred to as being "directly connected with" or "directly coupled to" another element, there are no intervening elements present.

Also, in the description of the present disclosure, an operation performed in a communication network may be performed in the process of controlling a network and transmitting data by a system (e.g., a server or a media center) administering the corresponding communication network, or may be performed by a terminal coupled to the corresponding network.

Throughout the specification and claims, unless explicitly described to the contrary, the word "comprise" and variations such as "comprises" or "comprising", will be understood to imply the inclusion of stated elements but not the exclusion of any other elements.

Figure 3:
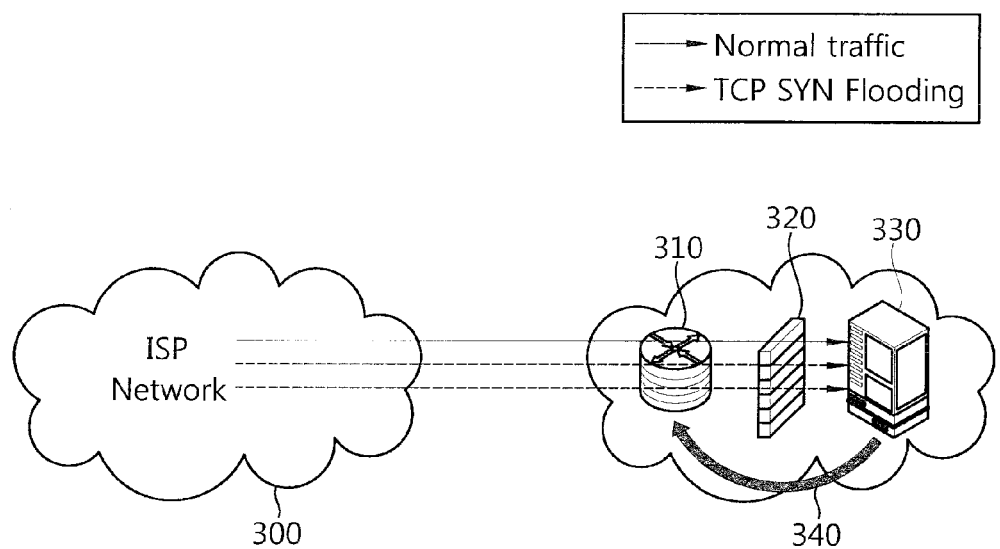
FIG. 3 is a conceptual view for schematically explaining detecting an attack of a distributed service rejection type and regulating traffic according to an exemplary embodiment of the present invention.

FIG. 3 is a conceptual view for schematically explaining detecting an attack of a distributed service rejection type and regulating traffic according to an exemplary embodiment of the present invention.

A server 330 providing a service in a network is connected to an ISP network 300 through a routing apparatus 310. A firewall 320 exists for security between the routing apparatus 310 and the server 330.

As shown in FIG. 3, when there is a distributed denial of service (DDoS) traffic delivered through the ISP network 300 includes normal traffic along with traffic to be attacked, e.g., TCP SYN flooding. Namely, when normal traffic of service users is delivered to the server 330 through the routing apparatus 310 and the firewall 320, the DDoS, e.g., the TCP SYN flooding, is also delivered in the same manner to the server 330. Thus, the load at the server 330 increases to reach a service interruption.

In the case in which a small amount of traffic, like the TCP SYN flooding, causes a service interruption in the server 330, generally, it is not easy to detect the attack only with the flow of the traffic in the network.

Thus, status information 340 of the server 330 may be transmitted from the server 330 to the routing apparatus 310 periodically or at a time according to determined conditions to allow the routing apparatus 310 to detect a change in the status of the server.

The server 330, which may become an attack target, transmits information regarding the status of the server 300 to the routing apparatus 310 periodically or at each time according to determined conditions. Here, the time according to the determined conditions may be a pre-set nonperiodical time interval or when the server 330 detects a sharp change in its status. The routing apparatus 310 receives the information regarding the status of the sever 330 and stores the same. The information regarding the status of the server 330 may be various types of information reflecting the status of the server 330 such as a CPU load of the server, a memory utilization rate of the server, information regarding a backlog queue state of the server, or the like.

The routing apparatus 310 may calculate a status variation of each server 330 according to the received status information of the server 330. The routing apparatus 310 compares the variation with a certain threshold value, and when the variation exceeds the threshold value, the routing apparatus 31 may determine that the corresponding server is under attack. In this case, the certain threshold value may be set to be different for each status information. The certain threshold value may be previously set by a network manager and so on. Also, the certain threshold value may be changed according to the status of the server. For example, when a service of the corresponding server becomes suddenly popular or when the interest in the service of the corresponding server is increasing, traffic may be concentrated in the corresponding server, so in this case, the certain threshold value with respect to the variation of each status information can be changed to be higher.

Upon detecting the attack against the server 300, the routing apparatus 310 takes measure according to a predetermined policy. For example, the routing apparatus 310 may transmit information regarding the server under attack along with information regarding the fact that the server is under attack to a network manager and/or a server manager. The routing apparatus 310 may cut off (i.e., block or intercept) traffic with respect to the server under attack. Alternatively, instead of cutting off the traffic with respect to the server under attack, the routing apparatus 310 may limit the traffic to an appropriate level of traffic, e.g., a predetermined amount of traffic so that the service provided by the corresponding server may not be interrupted.

Figure 4:
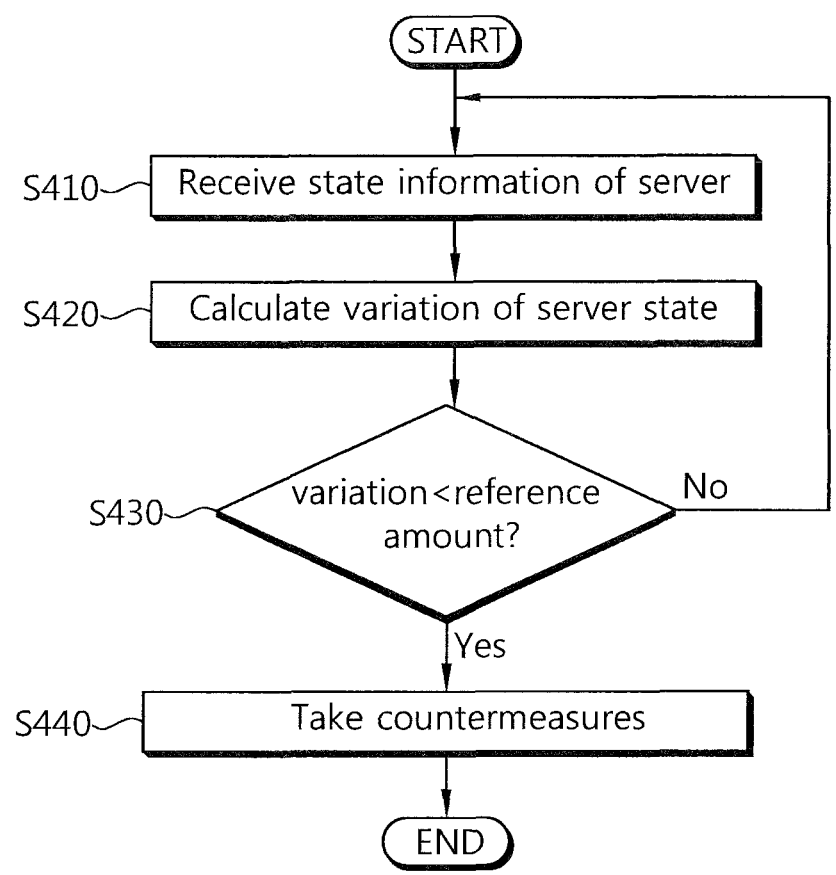
FIG. 4 is a flow chart illustrating the process of detecting an attack of a distributed service rejection type by a routing apparatus and handling the detected attack.

FIG. 4 is a flow chart illustrating the process of detecting an attack of a distributed service rejection type by a routing apparatus and handling the detected attack.

The routing apparatus receives information regarding a state of each server from each server in the network periodically or at each time according to determined conditions (S410). Here, the time according to the determined conditions may be a pre-set nonperiodical time interval. Or, the time according to the determined conditions may be a time at which a corresponding server detects a change exceeding a certain threshold value with respect to its status, upon checking it, and transmits status information to the routing apparatus.

As mentioned above, the status information of the server may be various types of information reflecting the status of the server such as a CPU load of the server, a memory utilization rate of the server, information regarding a backlog queue state of the server, or the like. The routing apparatus stores the received status information in the memory unit.

When the routing apparatus receives the status information from the server, it calculates a status variation of the server based on the received status information and the status information stored in the memory unit (S420). In this case, variations of various types of information reflecting the change in the status of the server such as an increased amount of the CPU load of the server, an increased amount of the memory utilization rate of the server, an increased amount of a connection request on standby in the backlog queue of the server, and the like.

The routing apparatus compares the calculated status variation of the server with a pre-set threshold value. When the status variation of the server is greater than the pre-set certain threshold value, the routing apparatus may determine that the corresponding server is currently under attack.

The certain threshold value may be set for each status information.

For example, when the status information of the server received by the routing apparatus relates to the CPU load of the server, the certain threshold value is a value previously determined with respect to a variation of the load. When a calculated increased amount of the CPU load of the server is greater than a predetermined variation of the load, the routing apparatus may determine that the corresponding server is under attack.

When the status information of the server received by the routing apparatus relates to the memory utilization rate of the server, the certain threshold value may be a value previously determined with respect to a variation of the memory utilization rate. When a calculated increased amount of the memory utilization rate of the server is greater than a predetermined variation of the memory utilization rate, the routing apparatus may determine that the corresponding server is under attack.

Similarly, when the status information of the server received by the routing apparatus relates to a connection request on standby in the backlog queue of the server, the certain threshold value may be a value previously determined with respect to a variation of the connection request. When a calculated increased amount of the connection request on standby in the backlog queue of the server is greater than a predetermined variation of the connection request, the routing apparatus may determine that the corresponding server is under attack.

The certain threshold value may be previously set by the network manage, and so on. Also, the certain threshold value may be changed according to the status of the server.

For example, when a service of the corresponding server becomes suddenly popular or when the interest in the service of the corresponding server is increasing, traffic may be concentrated in the corresponding server, so in this case, the certain threshold value with respect to the variation of each status information can be changed to be higher.

Here, the variation with respect to the status of the server has been described, but the present invention is not limited thereto and a numerical value denoting the status of the server may be compared with a certain threshold value to determine whether or not the corresponding server is under attack. For example, the routing apparatus previously sets threshold values for a CPU load of the server, a memory utilization rate of the server, the number of connection requests on standby in a backlog queue state of the server, or the like, and when the status values exceeds the certain threshold values, the routing apparatus may determine that the corresponding server is under attack.

When the routing apparatus determines that the server is in a normal state, without being attacked, it continues to receive the status information from the server (S410).

When the routing apparatus determines that the corresponding server is under attack, it takes countermeasures according to a predetermined policy (S440). For example, the routing apparatus may transmit information regarding the server under attack along with information regarding the fact that the server is under attack to a network manager and/or server manager. The routing apparatus may cut off (i.e., block or intercept) traffic with respect to the server under attack. Alternatively, instead of cutting off the traffic with respect to the server under attack, the routing apparatus may limit the traffic to an appropriate level of traffic, e.g., a predetermined amount of traffic so that the service provided by the corresponding server may not be interrupted.

After taking the countermeasures, namely, after cutting off or reducing the traffic with respect to the server as an attack target, the routing apparatus may recover the traffic according to certain conditions. Or, the routing apparatus may wait for a direct instruction or measure from the network manager and/or server manager, rather than recovering the traffic.

Figure 5:
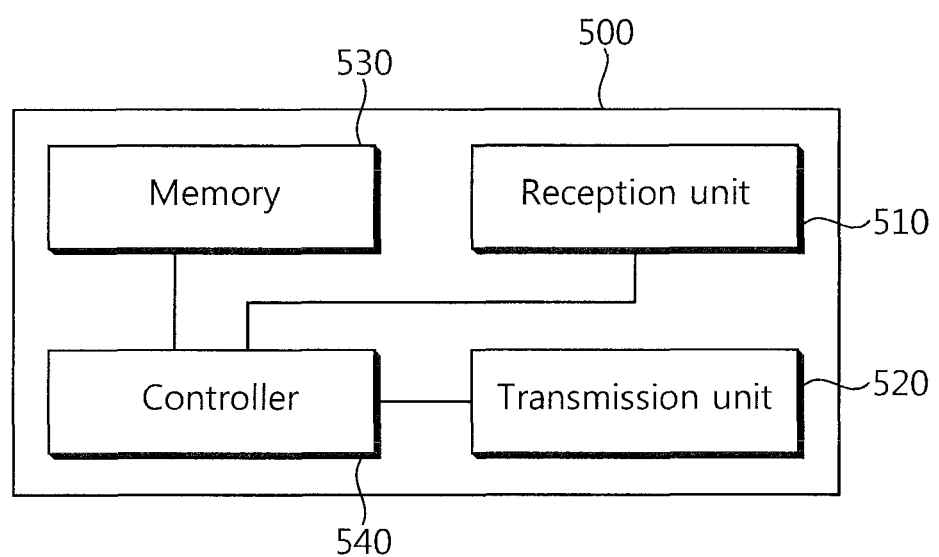
FIG. 5 is a schematic block diagram showing a functional configuration of a routing apparatus according to an exemplary embodiment of the present invention.

FIG. 5 is a schematic block diagram showing a functional configuration of a routing apparatus according to an exemplary embodiment of the present invention.

A routing apparatus 500 includes a reception unit 510, a transmission unit 520, a memory 530, and a controller 540.

The reception unit 510 serves as an input port of a packet provided to the routing apparatus 500 and receives status information of each server in a network.

The transmission unit 520 serves as an output port of a packet transmitted from the routing apparatus 500 and transmits a message with respect to each server in the network.

The memory 530 stores information/data required for operating the network, server status information received from each server, and a threshold value for the status information.

The controller 540 sets a path from a source of a data packet to a destination, and switches a data packet according to the path setting. Also, the controller 540 calculates a status variation of each server based on the server status information received from each server and the status information stored in the memory unit 530. The controller 540 compares the calculated server status variation or the received status value of each server with a certain threshold value to determine whether or not a corresponding server is under attack. When the controller determines that the corresponding server is under attack, the controller 540 regulates traffic with respect to the corresponding server.

When the controller determines that the server is under attack, the transmission unit 520 may transmit information regarding the fact that the server is under attack and information regarding the server under attack to a network manager and/or a manager of the corresponding server.

According to exemplary embodiments of the present invention, since the routing apparatus detects which of servers is currently under attack, it can reduce or cut off only traffic for the attack target among a great deal of traffic, without affecting the servers not under attack. Thus, since the amount of traffic for the server as the attack target is reduced by the routing apparatus, the server as the attack target can provide its service to users ceaselessly.

In the foregoing exemplary system, the methods are described based on the flow chart as sequential steps or blocks, but the present invention is not limited to the order of the steps and some of them may be performed in order different from the order of the foregoing steps or simultaneously. Also, a skilled person in the art will understand that the steps are not exclusive but may include other steps, or one or more steps of the flow chart may be deleted without affecting the scope of the present invention.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A routing apparatus comprising:
a reception unit configured to receive a packet transmitted in a network;
a transmission unit configured to transmit the packet along a transmission path;
a memory unit configured to store data and/or information required for an operation and to store a plurality of threshold values for respective multiple different types of server state information of one or more servers, wherein the types of server state information include at least two of a CPU load of the server, a connection request standby amount of a backlog queue of the server, or a memory utilization rate of the server; and
a controller configured to set the transmission path of the packet in the network and perform packet switching along the transmission path,
wherein the reception unit receives server state information from servers at every certain time, the memory unit stores the received server state information, and the controller calculates a change in the state of the servers based on comparing multiple values of the received server state information with at least a portion of the plurality of threshold values, and determines that a server is attacked when the change in the multiple values of the received server state information is greater than corresponding ones of the threshold values.

2. The apparatus of claim 1, wherein the server state information includes information regarding a CPU load of the server, and when an increased amount of the CPU load of the server is greater than a certain threshold value, the controller determines that the corresponding server is under attack.

3. The apparatus of claim 1, wherein the server state information includes information regarding a memory utilization rate of the server, and when an increased amount of the memory utilization rate of the server is greater than a certain threshold value, the controller determines that the corresponding server is under attack.

4. The apparatus of claim 1, wherein the server state information includes information regarding a backlog queue, and when an increment of connection requests on standby in the backlog queue of the server is greater than a certain threshold value, the controller determines that the corresponding server is under attack.

5. The apparatus of claim 1, wherein the server state information includes information regarding a backlog queue, and when the number of connection requests on standby in the backlog queue of the server is greater than a certain threshold value, the controller determines that the corresponding server is under attack.

6. The apparatus of claim 1, wherein when the controller determines that the corresponding server is under attack, the controller regulates traffic with respect to the corresponding server.

7. The apparatus of claim 1, wherein when the controller determines that the corresponding server is under attack, the controller notifies a network manager and/or a manager of the corresponding server accordingly.

8. A method for detecting an attack to a server by a network routing apparatus, the method comprising:
storing a plurality of threshold values for respective multiple different types of server state information of one or more servers, wherein the types of server state information include at least two of a CPU load of the server, a connection request standby amount of a backlog queue of the server, or a memory utilization rate of the server;
receiving server state information from servers in a network at every certain time;
calculating a change in each of the server states based on comparing multiple values of the server state information received at every certain time with at least a portion of the plurality of threshold values;
determining whether or not a server is under attack based on comparing the multiple values in each of the server states to corresponding ones of the threshold values; and
when it is determined that a server is under attack, regulating traffic with respect to the server.

9. The method of claim 8, wherein the server state information includes information regarding a CPU load of the server, and in the determining of whether or not the server is under attack, when an increased amount of the CPU load of the server is greater than a certain threshold value, it is determined that the corresponding server is under attack.

10. The method of claim 8, wherein the server state information includes information regarding a memory utilization rate of the server, and in the determining of whether or not the server is under attack, when an increased amount of the memory utilization rate of the server is greater than a certain threshold value, it is determined that the corresponding server is under attack.

11. The method of claim 8, wherein the server state information includes information regarding a backlog queue, and in the determining of whether or not the server is under attack, when an increased amount of connection requests on standby in the backlog queue of the server is greater than a certain threshold value, the controller may determine that the corresponding server is under attack.

12. The method of claim 8, wherein the server state information includes information regarding a backlog queue, and in the determining of whether or not the server is under attack, when the number of connection requests on standby in the backlog queue of the server is greater than a certain threshold value, it is determined that the corresponding server is under attack.

13. A network comprising:
a routing apparatus for controlling a transmission path of a packet and traffic in a network; and
servers in the network, wherein the routing apparatus comprises:

a reception unit configured to receive server state information from the servers in the network;

a memory unit configured to store the received server state information and to store a plurality of threshold values for respective multiple different types of server state information of one or more servers, wherein the types of server state information include at least two of a CPU load of the server, a connection request standby amount of a backlog queue of the server, or a memory utilization rate of the server; and a controller configured to calculate a change in each of the server states based on comparing multiple values of the received server state information with at least a portion of the plurality of threshold values, wherein the servers transmit server state information to the routing apparatus at every certain time, and when the multiple values are greater than corresponding ones of the threshold values, the controller of the routing apparatus determines that the corresponding server is under attack.

14. The network of claim 13, wherein the server state information includes information regarding a CPU load of the server, and when an increased amount of the CPU load of the server is greater than a certain threshold value, the controller of the routing apparatus determines that the corresponding server is under attack.

15. The network of claim 13, wherein the server state information includes information regarding a memory utilization rate of the server, and when an increased amount of the memory utilization rate of the server is greater than a certain threshold value, the controller of the routing apparatus determines that the corresponding server is under attack.

16. The network of claim 13, wherein the server state information includes information regarding a backlog queue, and when the number of connection requests on standby in the backlog queue of the server is greater than a certain threshold value, the controller of the routing apparatus determines that the corresponding server is under attack.

17. The network of claim 13, wherein the server state information includes information regarding a backlog queue, and when an increased amount of connection requests on standby in the backlog queue of the server is greater than a certain threshold value, the controller determines that the corresponding server is under attack.

18. The network of claim 13, wherein when the controller of the routing apparatus determines that one of the servers is under attack, the controller regulates traffic with respect to the corresponding server.

* * * * *